United States Patent [19]

Shimizu et al.

[11] Patent Number: 5,104,544

[45] Date of Patent: Apr. 14, 1992

[54] REFINING OF A RARE EARTH INCLUDING A PROCESS FOR SEPARATION BY A REVERSE OSMOSIS MEMBRANE

[75] Inventors: Hiroshi Shimizu, Tokyo; Kenichi Ikeda; Yoshiyasu Kamiyama, both of Osaka, all of Japan

[73] Assignee: Nitto Denko Corporation, Osaka, Japan

[21] Appl. No.: 594,597

[22] Filed: Oct. 9, 1990

[30] Foreign Application Priority Data

Oct. 6, 1989 [JP] Japan .................. 1-262540

[51] Int. Cl.⁵ .......................................... B01D 15/04
[52] U.S. Cl. .................................... 210/638; 210/652; 210/661; 210/663; 210/688; 210/805; 210/912
[58] Field of Search ............... 210/652, 650, 651, 638, 210/639, 679, 660, 661, 805, 806, 663, 912, 688

[56] References Cited

U.S. PATENT DOCUMENTS 4,206,048  6/1980  Guter ................................. 210/652
4,693,828  9/1987  Yoshioka et al. .................. 210/679
4,770,784  9/1988  Davis et al. ........................ 210/634

FOREIGN PATENT DOCUMENTS 2110517  10/1970  France .
3480295   6/1970  U.S.S.R. ............................. 210/660
1255201   9/1986  U.S.S.R. ............................. 210/660

Primary Examiner—Robert A. Dawson
Assistant Examiner—Ana Fortuna
Attorney, Agent, or Firm—Sughrue, Mion, Zinn, Macpeak & Seas

[57] ABSTRACT

The invention is concerned with a process of separation and refining of rare earths in which a dilute solution of rare earths, resulting from the step of separating and refining the rare earths by using an ion exchanger, is subjected to reverse osmosis membrane separation treatment to concentrate the solution and reduce its volume, while the water which has passed through the membrane is circulated for reuse in the step of separating and refining the rare earths.

7 Claims, 2 Drawing Sheets

REFINING OF A RARE EARTH INCLUDING A PROCESS FOR SEPARATION BY A REVERSE OSMOSIS MEMBRANE

BACKGROUND OF THE INVENTION

This invention relates to a system and process for the separation and refining of rare earths. In this system a dilute solution of rare earths resulting from the step of separating and refining the rare earths by using an ion exchanger is concentrated by a process for separation by a reverse osmosis membrane and is thereby reduced in volume, while the water which has passed through the membrane is circulated for reuse in the step of separating and refining the rare earths.

Although various processes are available for the separation and refining of rare earths, a process using an ion exchanger is generally employed for the separation and refining of rare earths to high purity.

The process in which an ion exchanger is used for the separation and refining of rare earths, however, has a number of drawbacks, as an eluate of rare earths is produced in a very large quantity. It requires a large number of large tanks, and centrifugal dehydrators, pumps, pipelines, valves, etc., each having a large capacity. It also requires a large amount of water. Thus, it requires expensive equipment. The precipitation and recovery of an eluant and the precipitation and separation of rare earths necessitate the use of large amounts of chemicals and water.

Other drawbacks of the process include the necessity of using large amounts of chemical diluting water, washing water and hot water for preparing the ion exchanger, and the necessity of using a large amount of water for cooling the eluate.

SUMMARY OF THE INVENTION

It is an object of this invention to provide a very effective process which can overcome the various drawbacks of the process in which an ion exchanger is used for the separation and refining of rare earths.

This invention is, thus, concerned with a process of and system for the separation and refining of rare earths which comprises subjecting a dilute solution of rare earths resulting from the step of separating and refining the rare earths by using an ion exchanger, to treatment by a process for separation by a reverse osmosis membrane to concentrate the solution and reduce its volume, while the water which has passed through the membrane is circulated for reuse in the step of separating and refining the rare earths.

DETAILED DESCRIPTION OF THE INVENTION

Figure 1:
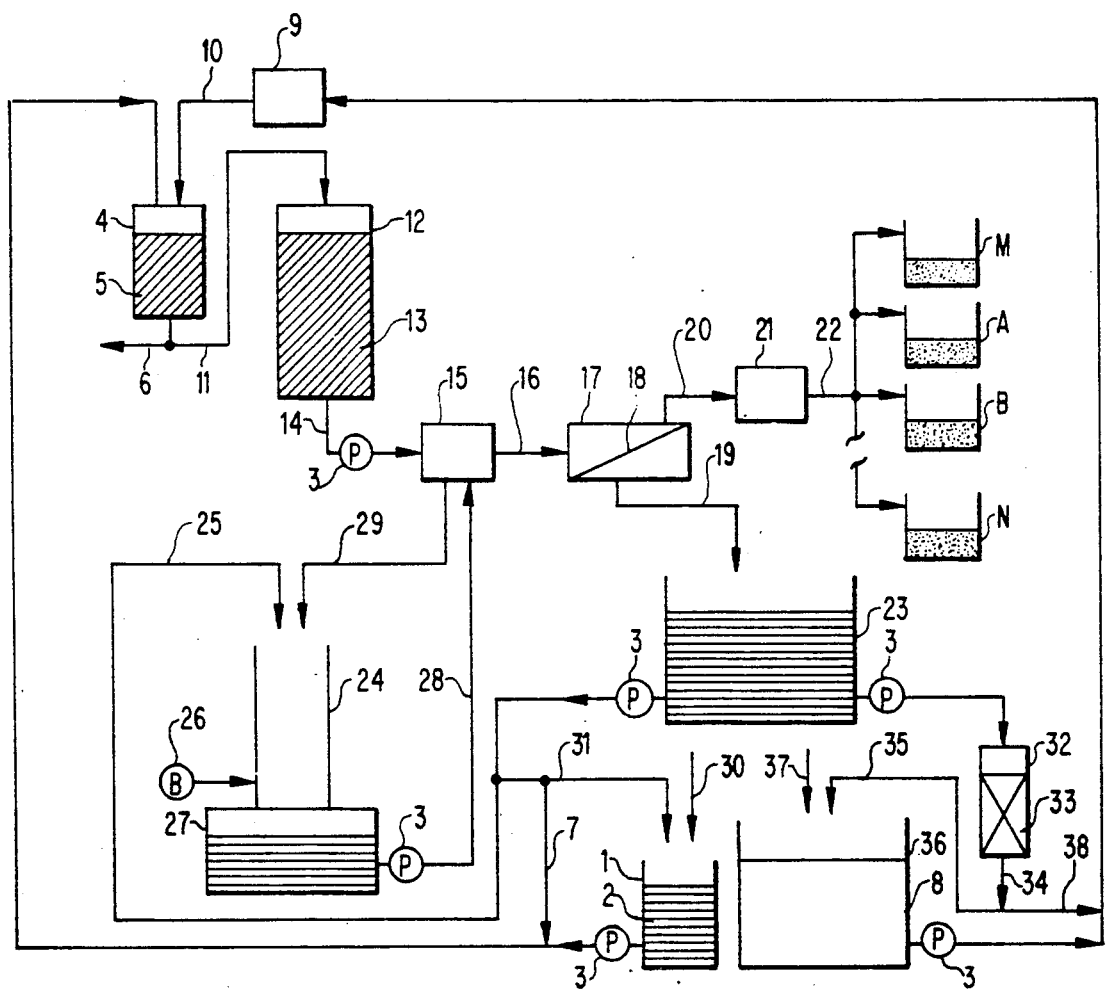
FIG. 1 shows by way of example a system embodying this invention and including the steps of treating an eluate of rare earths by a process for separation through a reverse osmosis membrane to concentrate it and reduce its volume, purifying the resulting water by an ion exchange process, and circulating the purified water for reuse in the step of separating and refining the rare earths.

The dilute solution of rare earths which is subjected to separation by a reverse osmosis membrane in accordance with this invention is, for example, an eluate resulting from the elution of rare earths, or a solution of a rare earth salt obtained by removing an eluant from the eluate.

The process which constitutes this invention for the separation of a dilute solution of rare earths is a process for separation using a reverse osmosis membrane which allows water to pass almost exclusively therethrough from a dilute aqueous solution of rare earths to produce desalted or deionized water of good quality, while preventing very effectively the passage of any rare earth salt, or any complex salt formed thereby with an eluant.

For the process for separation by a reverse osmosis membrane, it is possible to use any membrane without any particular limitation if it allows water to pass almost exclusively therethrough from a dilute aqueous solution of rare earths, while preventing very effectively the passage of any rare earth salt, or any complex salt formed thereby with an eluant. It is, for example, possible to use a membrane made of a hydrophilic material selected from polyamides, polyethers, polyvinyl alcohols and polyacrylonitriles. Although there is no particular limitation to the shape of the membrane, either, its thickness is preferably as small as possible to permit the passage of water at a high flow rate. Therefore, it is preferable to use, for example, a composite membrane which comprises an ultrathin film of any such material serving as an active layer for separation, and carried on a polysulfone, polyethersulfone, polyacrylonitrile, polyimide or polyamide supporting film. The modules which are employed to form a membrane ready for use may be of any of a wide variety of shapes including plain, stack, plate and frame, thin layer passage, pleat, tube, fine tube, capillary, spiral, and hollow fiber.

The eluate of rare earths which is employed in accordance with the system of this invention is an aqueous solution containing as an eluant a compound which forms a complex salt with rare earths. The eluant is a compound having a higher power of combining with rare earths than with an ion exchanger. It is, for example, an ammonium or sodium salt of a complex salt forming agent such as ethylenediaminetetraacetic acid (EDTA), N-hydroxylethylenediaminetetraacetic acid (HEDTA), diethylenetriaminepentaacetic acid (DTPA) or nitrilotriacetic acid (NTA), and an aqueous solution containing any such eluant is used as the eluant. If the eluant is passed through the ion exchanger which has adsorbed rare earths, they are eluted one after another in the order of their stability to the eluant so that the rare earth having the highest stability may first be eluted, and the separation and refining of each rare earth are eventually accomplished.

If the eluate has too high an eluant concentration, the elution curves for the rare earths to be eluted greatly overlap. If the concentration is too low, however, the eluate is produced in so large a quantity that its subsequent treatment requires large tanks, as well as centrifugal dehydrators, pumps, pipelines, valves, etc. each having a large capacity, and that the precipitation and recovery of the eluant and the precipitation and separation of rare earths require a large amount of chemicals.

Therefore, a dilute eluate having an eluant concentration of, 0.5 to 1.0% is normally used.

According to the process of this invention, an aqueous eluant solution containing a complex rare earth salt resulting from elution by a dilute eluant solution is treated by a process for separation through a reverse osmosis membrane, so that the complex rare earth salt and any excess eluant may be concentrated and reduced in volume, as water is allowed to pass away. It is, therefore, sufficient to use small tanks, centrifugal dehydrators, pumps, pipelines, valves, etc. when carrying out subsequently the precipitation and recovery of the excess by the addition of an acid, the centrifugal dehydration thereof, etc. It is also possible to decrease greatly the amount of the chemical which is required for the precipitation and recovery of the eluant. An aqueous solution of a rare earth salt which is obtained by removing the eluant composing the complex rare earth salt, and the excess, can be obtained by the precipitation of rare earths using, for example, oxalic acid as a precipitant. If the process for separation through a reverse osmosis membrane is employed in accordance with this invention for treating any such aqueous solution to concentrate the rare earth salt and reduce its volume, while allowing water to flow away, it is likewise sufficient to use small tanks, centrifugal dehydrators, pumps, pipelines, valves, etc. when carrying out the precipitation of rare earths, the collection of their precipitates, the centrifugal dehydration thereof, etc.

The concentration to be accomplished by the process for separation through a reverse osmosis membrane need be kept at a level not allowing any complex salt, or salt of any rare earth under concentration to exceed its soluble limit and start precipitation on the membrane or in an apparatus containing the membrane. This level is usually within the range of, about, 1.5 to 30 times as high as the original concentration. In order to prevent any such precipitation from occurring, it is desirable to employ as high as solution temperature as is possible within the temperature range allowable for the apparatus used for the separation through a reverse osmosis membrane, so that the complex salt, or salt of any rare earth may have greater solubility.

As regards the ion exchanger used for the purpose of this invention, it is possible to use any cation exchanger comprising a high molecular matrix having an acidic group such as a sulfonic acid group or carboxyl group, or two or more such groups, if it can adsorb rare earth ions by ion exchange and be subjected to elution treatment with the eluant solution to allow the separation of rare earths. It is also possible to use a chelate ion exchanger which can form a complex with rare earths. The ion exchanger may, for example, be an ion exchange resin in the form of spherical or shaped particles, or an elongated fibrous ion exchanger. If an ion exchange resin is used, it is preferable to use one having a small particle diameter to ensure the efficient elution and separation of rare earths, and particularly, one composed of spherical particles having a diameter of, about, 0.01 to 0.1 mm. If a fibrous anion exchanger is used, it is desirable to use one having a fiber diameter which is as small as 5 to 50 microns, and fiber length which is, about, 3 to 50 times as large as its diameter. As its particle diameter becomes smaller, the ion exchange resin requires the supply of the eluant solution at a higher pressure, as it causes a sharply increasing pressure loss, but the fibrous ion exchanger has the advantage of not causing any such pressure loss.

The water which has passed through the reverse osmosis membrane during the process for separation is reused in the system for the separation and refining of rare earths according to this invention. It is desalted and deionized water of relatively good quality, but as it contains very small amounts of rare earths, eluant, etc., it need be reused only when the presence of those impurities is permissible. Specific purposes for which such water can be reused will hereinafter be set forth.

If the dilute solution of rare earths which is subjected to separation through the reverse osmosis membrane is an eluate resulting from the elution of the rare earths, the resulting water can, for example, be reused for these purposes, i.e., as water used for the step of adsorption in an adsorption column provided with an ion exchanger and the steps preceding and following it in which a solution for adsorption is prepared by extracting rare earths from minerals containing them; as water used for purging and washing the adsorption column after it has been supplied with the solution for adsorption; as water used for the countercurrent washing of the adsorption column before and after the step of adsorption; as water used for diluting an acid to prepare an aqueous acid solution for use in acid treatment prior to adsorption; as water used for purging and washing the adsorption column after it has been supplied with the aqueous acid solution; as an auxiliary supply of water as a medium for heating an eluant solution for rare earths; as an auxiliary supply of water to a boiler for producing steam for heating; as an auxiliary supply of water as a medium for cooling the eluate; and as an auxiliary supply of water for cooling a cooling medium.

Even when the dilute solution subjected to separation is a solution of a rare earth salt obtained by removing the eluant from the eluate of rare earths, the resulting water can be reused for any of the purposes as hereinabove set forth, if it is subjected to any necessary preliminary treatment, such as pH adjustment, prior to treatment by the reverse osmosis membrane.

If the water resulting from the process for separation through the reverse osmosis membrane according to this invention is purified by an ion exchange process which can remove any rare earths, eluant, etc. that it contains in small amounts, it can be reused for the preparation of an eluant solution for rare earths which requires a larger quantity of water having higher purity than any other step in the system for the separation and refining of rare earths does, and can, therefore, be reused as all kinds of water that are required in the system.

The ion exchange process must always be carried out by using at least a cation exchanger. It is preferable to use both a cation and an anion exchanger.

In the ion exchanger process in which only a cation exchanger is used, it is desirable to use a strongly acidic cation exchanger having a strongly acidic group, such as sulfonic acid group, in matrix as, for example, a hydrogen, ammonium or sodium type of ion exchanger, though it is also possible to use a cation exchanger of medium or weak acidity having e.g. a carboxyl group in a matrix as a e.g. an ammonium or sodium type of ion exchanger.

The ion exchange process in which both a cation and an anion exchanger are used is carried out by using any of the strongly acidic cation exchangers of the hydrogen ion type as mentioned above, and a strongly basic anion exchanger of the hydroxide ion type having a strongly basic group, such as a quarternary ammonium base, in a matrix. The combination of the cation and anion exchangers may be either by a double bed type of deionization system in which two separate columns are filled with the two ion exchangers, respectively, or a mixed bed type of deionization system in which a single column is filled with the mixture of the two ion exchangers.

The system of this invention will now be described with reference to the drawings.

Referring to FIG. 1, a solution 2 containing the rare earth to be adsorbed is supplied from a tank 1 to an adsorption column 4 by a pump 3, the rare earth is adsorbed by an ion exchanger 5 for adsorption, and a waste solution 6 is discharged. Then, water 7 is supplied to the adsorption column 4 for purging and washing it, and is discharged as the waste solution 6. An eluant solution 8 is supplied from its tank 36 to a heat exchanger 9 by a pump 3 and is heated. The hot eluant solution 10 is supplied to the adsorption column 4 to desorb the rare earth, and a solution 11 containing the desorbed rare earth is supplied to a separation column 12. The rare earth is separated by an ion exchanger 13 for separation and an eluate 14 of rare earth is supplied by a pump 3 to a heat exchanger 15 for eluate cooling in which it is cooled. The cooled eluate 16 is supplied to a reverse osmosis membrane apparatus 17 in which water is allowed to pass through a reverse osmosis membrane 18, and the water 19 which has passed through the reverse osmosis membrane is discharged.

A concentrated solution 20 of rare earths is collected and supplied to a heat exchanger 21 in which it is further cooled. A cooled concentrate 22 of rare earths is distributed to a tank M for a cooled concentrate of a rare earth mixture, a tank A for a cooled concentrate of a rare earth A, a tank B for a cooled concentrate of a rare earth B, etc., and finally a tank N for a cooled concentrate of a rare earth N.

The water 19 which has been separated from the eluate is received in its tank 23, and is supplied through a pump 3 for reuse as the water 7 for purging and washing the adsorption column 4 and also as an auxiliary source of water 25 for a cooling column 24. Waste water 29 leaving the heat exchanger 15 after cooling the eluate is introduced into the cooling column 24, is cooled by air blown into it through a blower 26, and is collected in a cooling water tank 27 from which cooling water 28 is supplied to the heat exchanger 15 through a pump 3. The water in the tank 23 is also supplied to the tank 1 for reuse as water 31 for diluting a concentrated solution 30 of rare earths to be adsorbed.

The water in the tank 23 is also supplied to a mixed bed type ion exchange column 32 through another pump 3 and is deionized by a mixed bed of ion exchange resins 33. The deionized water 34 is supplied to the tank 36 for reuse as water 35 for diluting an eluant 37 and is also supplied through the heat exchanger 9 to the adsorption column 4 for reuse as water 38 for purging and washing it to remove the eluant solution which has been used for elution.

Figure 2:
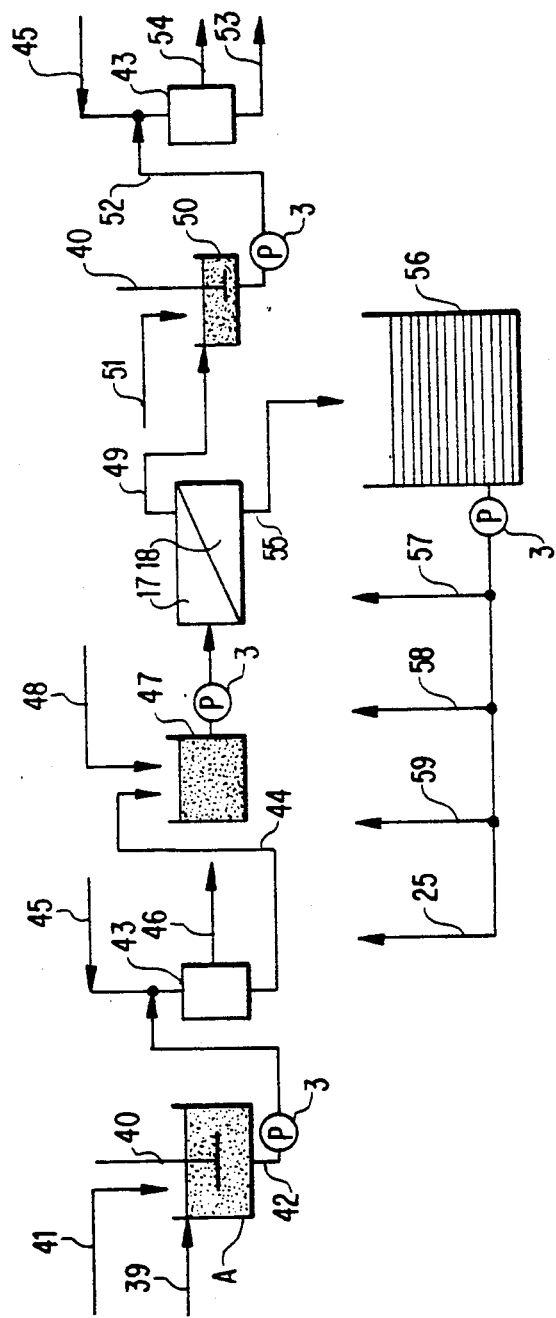
FIG. 2 shows by way of example another system embodying this invention and including the steps of concentrating a solution of a rare earth salt by a process for separation through a reverse osmosis membrane to reduce its volume, and circulating the purified water for reuse in the step of separating and refining the rare earths.

Referring to FIG. 2, an acid 41 for eluant precipitation is added into the tank A containing a cooled concentrate 39 of rare earth A, while it is stirred by a stirrer 40. A slurry 42 thereby formed and containing the eluant and the solution of rare earth A is supplied to a centrifugal dehydrator 43 through a pump 3 and is dehydrated. Pure water 45 is introduced to wash the dehydrated product. An aqueous solution 44 of a salt of rare earth A is delivered to its tank 47, while a cake 46 of the eluant is collected for reuse as the eluant.

An alkali 48 is added into the tank 47 to neutralize the aqueous solution of salt of rare earth A. The neutralized solution is supplied through a pump 3 into a reverse osmosis membrane apparatus 17 in which water is allowed to pass through a reverse osmosis membrane 18. The water 55 which has passed through it is discharged and a cooled concentrate 49 of salt of rare earth A is collected in its tank 50. An aqueous solution 51 of oxalic acid is added into the tank 50 under stirring by a stirrer 40. A slurry 52 of rare earth A oxalate which has been produced is introduced into a centrifugal dehydrator 43 through a pump 3 and is dehydrated. Pure water 45 is introduced for washing, and while waste water 53 is discharged, a cake 54 of rare earth A oxalate is collected for delivery to the process in which it is refined and formed into a rare earth product.

The water 55 which has been separated from the rare earth salt is collected in its tank 56 and is supplied through a pump 3 for reuse as water 57 for preparing the acid to be added into the adsorption column, as water 58 for purging and washing the adsorption column to remove the acid, as an auxiliary source of water 59 to the boiler, as an auxiliary source of water 25 for the cooling column, etc.

Although the necessity of a very large amount of water has been a major drawback of the system in which an ion exchanger is used for the separation and refining of rare earths, the system of this invention including a process for separation through a reverse osmosis membrane enables a drastic reduction in the overall amount of water which is required, since a large amount of water passing through the membrane can be reused as it is, or after purification by an ion exchange process. This invention, thus, adds a great deal of improvement and benefit to the system for the separation and refining of rare earths which is based on ion exchange.

EXAMPLE

The invention will now be described in further detail with reference to a few examples thereof.

EXAMPLE 1

A solution prepared by using 300 g mol of gadolinium chloride having a purity of 95%, and having a gadolinium content of 0.01 g mol per liter and a pH of 2 was passed into an adsorption column filled with 500 kg of cation exchange fibers having a short diameter of 10 microns, a long diameter of 30 microns, a length of 250 microns, a sulfone content of 2.4 mg eq/g, a carboxyl content of 0.7 mg eq/g, and a total cation exchange capacity of 3.1 mg eq/g, and gadolinium ions were thereby adsorbed. The waste solution was discharged, and pure water was introduced for purging the column and washing away any remaining solution.

An aqueous solution containing 5 g of diammonium salt of ethylenediaminetetraacetic acid per liter was supplied as an eluant solution to the adsorption column at a rate of 30 m3/h through a pump and a heat exchanger for heating in which it was heated to 75° C. The solution leaving the column was conveyed to a separation column connected in series to the adsorption column and filled with 5000 kg of the same kind of cation exchange fibers, whereby gadolinium was separated and eluted. 195 m$^3$ of a pure gadolinium eluate was cooled to 38° C. in a first heat exchanger for cooling, and supplied to a reverse osmosis membrane separation apparatus, in which it was subjected to reverse osmosis treatment.

The elements used for the reverse osmosis membrane were the products of Nitto Denko Corp. designated as NTR-759HRS8. The elements had an outside diameter of 8 in. and a length of 40 in. When they were fed with a 0.15% aqueous solution of sodium chloride and evaluated for their basic performance under conditions including an operating pressure of 15 kgf/cm$^2$G, a temperature of 25° C. and a recovery ratio of 15%, they showed a retaining ratio of 99.5%, while allowing the passage of 30 m$^3$ of water a day.

A reverse osmosis system was organized by a Christmas-tree arrangement of modules consisting of a front stage of four modules and a back stage of two modules which were connected in series to one another along a path for waste solution, each module being defined by four elements mounted in a pressure vessel. The system was supplied with the rare earth eluate of 38° C. at a rate of 30 m$^3$/h and was operated at a recovery ratio of 67% and an average pressure of 8 kgf/cm$^2$G.

Plasma emission spectroscopic analysis was made to determine the concentration of gadolinium in each of the solution fed to the reverse osmosis membrane apparatus, the solution passing through the membrane, and the concentrate. The solution fed to the apparatus showed an average value of 1.23 mg mol/liter, the solution passing through the membrane an average value of 0.0017 mg mol/liter, and the concentrate an average value of 3.7 mg mol/liter. The concentration of the eluant, diammonium salt of ethylenediaminetetraacetic acid, in the solution passing through the membrane was 4.5 mg/liter. It, therefore, follows that the system achieved a retaining ratio of 99.86% for a complex salt of gadolinium and ethylenediaminetetraacetic acid, and a retaining ratio of 99.9% for free diammonium ethylenediaminetetraacetate (presumably amounting to 4.60 g/liter).

The concentrate which had been obtained was cooled to 10° C. in a second heat exchanger for cooling connected in series to a concentrate pipe extending from the reverse osmosis membrane apparatus. Concentrated hydrochloric acid was added until a pH of 1.1 was reached. The resulting precipitate of ethylenediaminetetraacetic acid was separated by a centrifugal dehydrator. A cake was washed with pure water and a thick aqueous solution of gadolinium chloride was collected. The consumption of hydrochloric acid was 35% of the amount which had to be used when no reverse osmosis membrane apparatus was employed.

The water which had passed through the membrane could be reused as water for preparing the rare earth solution for feeding to the adsorption column, as water for purging and washing the adsorption column to remove the solution after its adsorption of rare earth, as water for preparing hydrochloric acid for conditioning the adsorption and separation columns, and as water for purging and washing the columns after hydrochloric acid treatment. It could also be reused as an auxiliary source of water to the boiler for heating the eluant solution and as an auxiliary source of water to the cooling column for preparing cooling water.

When such water had been passed through a mixed bed polisher filled with a hydrogen type of a strongly acidic cation exchange resin and a hydroxyl type of strongly basic anion exchange resin, there was obtained pure water having a high purity as represented by a resistance of at least 10,000,000 ohm.cm (25° C.). It could, therefore, be reused as water for the preparation of the eluant solution for which a larger amount of pure water having better quality was required. It could also be reused for any other purpose for which water was required in the system for the separation and refining of rare earths. As a result, the consumption of water by the system was about 60% of the amount required by any conventional process.

EXAMPLE 2

A solution having a rare earth content of 0.01 g mol/liter and a pH of 2 was prepared by using 300 g mol of each of chlorides of holmium, yttrium, gadolinium, samarium and lanthanum having a purity of 95%. The process of Example 1 was followed for the adsorption and elution of each rare earth to produce an eluate of each pure rare earth, i.e. holmium, yttrium, gadolinium, samarium or lanthanum. The reverse osmosis membrane apparatus as had been used in Example 1 was used for the treatment of a part of each eluate to form a concentrate. Each concentrate was cooled to 10° C., and concentrated hydrochloric acid was added to each concentrate under stirring until a pH of 1.0 to 1.1 was reached, whereby the eluant, ethylenediaminetetraacetic acid, was precipitated. Each concentrate was introduced into a centrifugal dehydrator in which the eluant was separated by dehydration from a cake. Pure water was poured over each cake to wash it and the resulting solution was collected in a tank for holding a pure rare earth solution.

Thick ammonia water was added to the aqueous solution of rare earth chloride in each tank, to decrease the pH to 5.5. Then, the same reverse osmosis membrane elements as had been used in Example 1 were used for concentrating each solution. The operating conditions included a solution temperature of 25° C., an average pressure of 25 kgf/cm$^2$G and a recovery ratio of 80%. The method as used in Example 1 was employed for the analysis of each rare earth.

A table below shows the results of analysis made of the rare earths in the solutions fed to the reverse osmosis membrane apparatus, the solutions passing through the membrane, and the concentrates. An average retaining ratio of 99.02 to 99.95% was achieved for the rare earth chlorides. The water passing through the membrane showed a retaining ratio of 99.8% for free diammonium salt of ethylenediaminetetraacetic acid, and a retaining ratio of 98.2% for ammonium chloride. This meant desalting from 8400 mg/liter to 150 mg/liter. When the above described system was used for producing pure water by a double bed type water purifying apparatus including an ion exchange resin, and treated by a mixed bed type polisher, there was obtained pure water having a high purity as represented by a resistance of 10,000,000 ohm.cm (25° C.). It could be reused as water for any purpose in the system for the separation and refining of rare earths.

TABLE

| Rare earth chloride | Rare earth Solution fed to membrane | concentration Concentrate | (mg mol/ liter) Solution passing through membrane | Rare earth retaining ratio (%) |
| --- | --- | --- | --- | --- |
| Ho | 6.2 | 30.9 | 0.0070 | 99.89 |
| Y | 5.1 | 25.0 | 0.0500 | 99.02 |
| Gd | 3.7 | 18.4 | 0.0037 | 99.90 |
| Sm | 3.4 | 17.0 | 0.0016 | 99.95 |

TABLE-continued

| Rare earth chloride | Rare earth Solution fed to membrane | concentration Concentrate | (mg mol/ liter) Solution passing through membrane | Rare earth retaining ratio (%) |
| --- | --- | --- | --- | --- |
| La | 3.0 | 14.8 | 0.0098 | 99.67 |

What is claimed is:

1. A process for separating and refining a rare earth comprising:
   (a) processing a solution of at least one rare earth using an ion exchanger to produce a dilute solution of said at least one rare earth;
   (b) treating said dilute solution from step (a) using a reverse osmosis membrane to concentrate said dilute solution and reduce its volume;
   (c) recycling water passed through said reverse osmosis membrane for use in said step (a);
   (d) and collecting rare earth concentrate.

2. The process for separating and refining at least one rare earth as set forth in claim 1, wherein said dilute solution is an eluate obtained by the elution of said at least one rare earth from said ion exchanger.

3. The process for separating and refining a rare earth as set forth in claim 1, wherein said dilute solution is a solution of a rare earth salt obtained by removing an eluant from an eluate of said at least one rare earth.

4. A process for separating and refining a rare earth as set forth in claim 1 wherein said water from said reverse osmosis membrane is purified using an ion exchange process before being recycled to step (a).

5. The process for separating and refining a rare earth as set forth in claim 4, wherein said step (a) involves preparing an eluate of said at least one rare earth.

6. The process for separating and refining a rare earth as set forth in claim 1, wherein said ion exchange is an ion exchange resin.

7. The process for separating and refining a rare earth as set forth in claim 1, wherein said ion exchange is an ion exchange fiber.

* * * * *